United States Patent
Benjamin et al.

(10) Patent No.: US 10,221,719 B2
(45) Date of Patent: Mar. 5, 2019

(54) SYSTEM AND METHOD FOR COOLING TURBINE SHROUD

(71) Applicant: General Electric Company, Schenectady, NY (US)

(72) Inventors: Marc Lionel Benjamin, Taylors, SC (US); Benjamin Paul Lacy, Greer, SC (US); Gregory Thomas Foster, Greer, SC (US); San Jason Nguyen, Simpsonville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 442 days.

(21) Appl. No.: 14/971,383

(22) Filed: Dec. 16, 2015

(65) Prior Publication Data

US 2017/0175580 A1 Jun. 22, 2017

(51) Int. Cl.
*F01D 25/14* (2006.01)
*F02C 7/18* (2006.01)
(Continued)

(52) U.S. Cl.
CPC .............. *F01D 25/14* (2013.01); *F01D 9/04* (2013.01); *F01D 11/08* (2013.01); *F01D 25/24* (2013.01);
(Continued)

(58) Field of Classification Search
CPC .......... F01D 11/08; F01D 11/24; F01D 25/14; F01D 25/24; F01D 9/04; F02C 7/12;
(Continued)

(56) References Cited

U.S. PATENT DOCUMENTS

| 5,829,245 A | 11/1998 | McQuiggan et al. |
| 6,179,557 B1 * | 1/2001 | Dodd ........................ F01D 9/00 415/108 |

(Continued)

FOREIGN PATENT DOCUMENTS

| EP | 1 517 008 A2 | 3/2005 |
| EP | 2 860 358 A1 | 4/2015 |

(Continued)

OTHER PUBLICATIONS

Extended European Search Report and Opinion issued in connection with corresponding EP Application No. 16201765.1 dated May 24, 2017.

(Continued)

*Primary Examiner* — Scott Walthour
(74) *Attorney, Agent, or Firm* — Fletcher Yoder, P.C.

(57) ABSTRACT

A shroud segment that includes a body including a leading edge, a trailing edge, a first side edge, a second side, and a pair of opposed lateral sides. A first lateral side is configured to interface with a cavity having a cooling fluid, and a second lateral side is oriented toward a hot gas flow path. The shroud segment includes a first channel disposed within the body having a first end portion and a second end portion and a second channel disposed within the body having a third end portion and a fourth end portion. The first and second channels are configured to receive the cooling fluid from the cavity to cool the body. The first end portion and the fourth end portion each include a hook-shaped portion having a free end.

15 Claims, 6 Drawing Sheets

(51) Int. Cl.
*F01D 9/04* (2006.01)
*F01D 11/08* (2006.01)
*F01D 25/24* (2006.01)
*F02C 3/04* (2006.01)
*F02C 7/12* (2006.01)
*F04D 29/52* (2006.01)
*F04D 29/58* (2006.01)

(52) U.S. Cl.
CPC ............ *F01D 25/246* (2013.01); *F02C 3/04* (2013.01); *F02C 7/12* (2013.01); *F02C 7/18* (2013.01); *F04D 29/522* (2013.01); *F04D 29/584* (2013.01); *F05D 2220/32* (2013.01); *F05D 2240/11* (2013.01); *F05D 2240/35* (2013.01); *F05D 2250/75* (2013.01); *F05D 2260/202* (2013.01); *F05D 2260/204* (2013.01); *Y02T 50/676* (2013.01)

(58) Field of Classification Search
CPC ........ F02C 7/18; F04D 29/522; F04D 29/584; F05D 2240/11; F05D 2260/202; F05D 2260/204
See application file for complete search history.

(56) References Cited

U.S. PATENT DOCUMENTS

| | | | |
|---|---|---|---|
| 7,284,954 B2 | 10/2007 | Parker et al. | |
| 7,306,424 B2 | 12/2007 | Romanov et al. | |
| 7,510,370 B2 | 3/2009 | Strangman et al. | |
| 7,513,040 B2 | 4/2009 | Cunha et al. | |
| 7,537,431 B1 | 5/2009 | Liang | |
| 7,553,128 B2 | 6/2009 | Abdel-Messeh et al. | |
| 7,597,533 B1 | 10/2009 | Liang | |
| 7,621,719 B2 | 11/2009 | Lutjen et al. | |
| 7,653,994 B2 | 2/2010 | Dasilva et al. | |
| 7,900,458 B2 | 3/2011 | James et al. | |
| 8,061,979 B1 | 11/2011 | Liang | |
| 8,449,246 B1 | 5/2013 | Liang | |
| 8,556,575 B2 | 10/2013 | Knapp et al. | |
| 8,647,053 B2 | 2/2014 | Hsu et al. | |
| 8,727,704 B2 | 5/2014 | Lee et al. | |
| 8,876,458 B2 | 11/2014 | Thibodeau et al. | |
| 8,894,352 B2 | 11/2014 | Berrong et al. | |
| 8,998,572 B2 | 4/2015 | Lutjen et al. | |
| 9,017,012 B2 | 4/2015 | Brunelli et al. | |
| 9,127,549 B2 | 9/2015 | Lacy et al. | |
| 2012/0057968 A1* | 3/2012 | Lee | F01D 11/08 415/178 |
| 2012/0124832 A1 | 5/2012 | Bunker et al. | |
| 2013/0287546 A1* | 10/2013 | Lacy | F01D 5/225 415/108 |
| 2014/0219780 A1* | 8/2014 | Lacy | F01D 25/12 415/116 |
| 2017/0101881 A1* | 4/2017 | Romanov | F01D 11/08 |
| 2017/0101890 A1* | 4/2017 | Dutta | F01D 9/041 |
| 2017/0175574 A1* | 6/2017 | Benjamin | F01D 5/02 |
| 2017/0175575 A1* | 6/2017 | Benjamin | F01D 9/04 |

FOREIGN PATENT DOCUMENTS

EP 3 156 608 A1 4/2017
EP 3 156 612 A1 4/2017

OTHER PUBLICATIONS

U.S. Appl. No. 14/971,478, filed Dec. 16, 2015, Marc Lionel Benjamin.
U.S. Appl. No. 14/971,585, filed Dec. 16, 2015, Marc Lionel Benjamin.
U.S. Appl. No. 14/971,674, filed Dec. 16, 2015, Marc Lionel Benjamin.
U.S. Appl. No. 14/971,724, filed Dec. 16, 2015, Marc Lionel Benjamin.

* cited by examiner

SYSTEM AND METHOD FOR COOLING TURBINE SHROUD

BACKGROUND

The subject matter disclosed herein relates to gas turbine engines, and more specifically, to turbine shrouds for gas turbine engines.

A turbomachine, such as a gas turbine engine, may include a compressor, a combustor, and a turbine. Gases are compressed in the compressor, combined with fuel, and then fed into to the combustor, where the gas/fuel mixture is combusted. The high temperature and high energy exhaust fluids are then fed to the turbine along a hot gas path, where the energy of the fluids is converted to mechanical energy. High temperatures along the hot gas path can heat turbine components (e.g., turbine shroud), causing degradation of components.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a shroud segment for use in a turbine section of a gas turbine engine is provided. The shroud segment includes a body including a leading edge, a trailing edge, a first side edge, a second side, and a pair of opposed lateral sides between the leading and trailing edges and the first and second side edges. A first lateral side of the pair of opposed lateral sides is configured to interface with a cavity having a cooling fluid, and a second lateral side of the pair of opposed lateral sides is oriented toward a hot gas flow path. The shroud segment also includes a first channel disposed within the body. The first channel includes a first end portion and a second end portion. The first end portion is disposed adjacent the first side edge and the second end portion is disposed adjacent the second side edge. The shroud segment further includes a second channel disposed within the body, wherein the second channel includes a third end portion and a fourth end portion. The third end portion is disposed adjacent the first side edge and the fourth end portion is disposed adjacent the second side edge. The first and second channels are configured to receive the cooling fluid from the cavity to cool the body. The first end portion and the fourth end portion each include a hook-shaped portion having a free end.

In accordance with a second embodiment, a gas turbine engine is provided. The gas turbine engine includes a compressor, a combustion system, and a turbine section. The turbine section includes an outer casing, an outer shroud segment coupled to the outer casing, and an inner shroud segment coupled to the outer shroud segment to form a cavity configured to receive a cooling fluid from the compressor. The inner shroud segment includes a body having a leading edge, a trailing edge, a first side edge, a second side edge, and a pair of opposed lateral sides between the leading and trailing edges and the first and second side edges. A first lateral side of the pair of opposed lateral sides is configured to interface with the cavity, and a second lateral side of the pair of opposed lateral sides is oriented toward a hot gas flow path. The inner shroud segment includes multiple channels disposed within the body and extending from adjacent the first side edge to adjacent the second side edge. Each channel of the multiple channels includes a first end portion having a hook-shaped portion and a second end portion. The multiple channels are configured to receive the cooling fluid from the cavity to cool the body.

In accordance with a third embodiment, a shroud segment for use in a turbine section of a gas turbine engine is provided. The shroud segment includes a body including a leading edge, a trailing edge, a first side edge, a second side, and a pair of opposed lateral sides between the leading and trailing edges and the first and second side edges. A first lateral side of the pair of opposed lateral sides is configured to interface with a cavity having a cooling fluid, and a second lateral side of the pair of opposed lateral sides is oriented toward a hot gas flow path. The shroud segment also includes multiple channels disposed within the body and extending from adjacent the first side edge to adjacent the second side edge, wherein each channel of the multiple channels includes a first end portion having a hook-shaped portion and a second end portion. The shroud segment further includes a respective inlet passage of the multiple inlet passages coupled to each free end and extending from the free end to the first lateral side, wherein the multiple inlet passages are configured to provide the cooling fluid from the cavity to the respective channels of the multiple channels.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
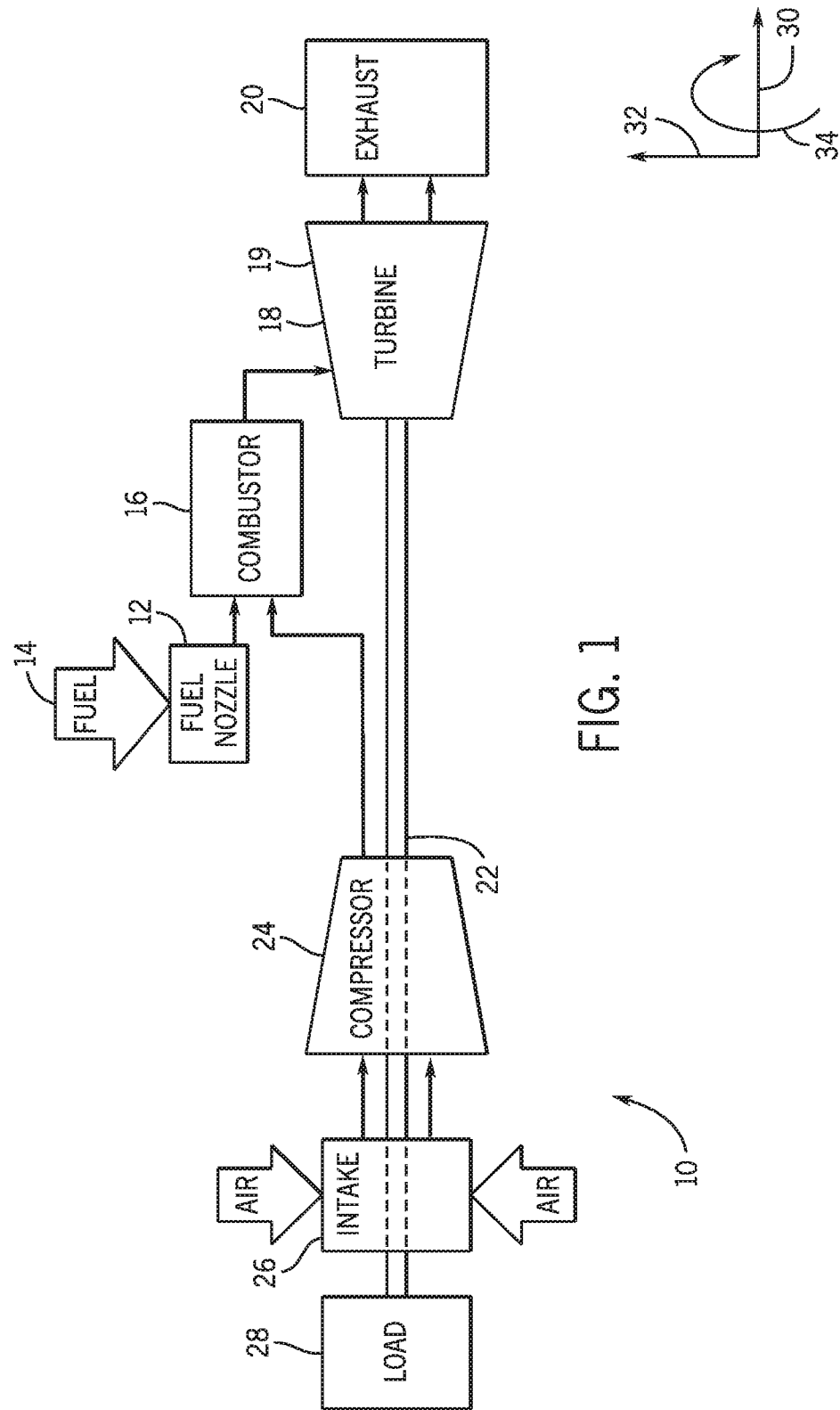
FIG. 1 is a block diagram of an embodiment of a turbine system having a turbine shroud with cooling channels.

One or more specific embodiments of the present subject matter will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems and methods for cooling components of a turbine (e.g., turbine shroud) disposed along a hot gas flow path. In particular, an inner turbine shroud segment includes a body that includes near surface channels (e.g., micro-channels) disposed on a lateral side oriented toward the hot gas flow path. A pre-sintered preform layer disposed over (e.g., brazed on) the lateral side with the channels together with the body defines the channels. Each channel includes a first end portion having a hook-shaped portion and a second end portion. In certain embodiments, the second end portion includes a metering feature. In certain embodiments, each channel itself (excluding the second end portion) acts as a metering feature. In other embodiments, inlet passages coupled to the hook-shaped portion may include a metering feature. In certain embodiments, the channel itself, the second end portion, or the inlet passage, or a combination thereof includes a metering feature. The channels extend between opposing side edges (e.g., slash faces). In certain embodiments, the channels are disposed within the body in an alternating pattern with one channel having the hook-shaped portion disposed adjacent one side edge and the second end portion disposed adjacent the opposite side edge with the adjacent channel having the opposite orientation. The channels are configured to receive a cooling fluid (e.g., discharge air or post-impingement air from a compressor) from a cavity (e.g., bathtub) defined by the inner turbine shroud segment and an outer turbine shroud segment coupled to the inner turbine shroud segment via inlet passages coupled to a lateral side of the inner turbine shroud segment that interfaces with the cavity (i.e., the lateral side opposite the lateral side oriented toward the hot gas flow path). The outlet passages of the channels discharge the cooling fluid (e.g., spent cooling fluid) from the body via exit holes. The hook-shaped portions of the channels provide a larger cooling region (e.g., larger than typical cooling systems for turbine shrouds) by increasing a length of cooling channel adjacent the slash faces while keeping flow at a minimum. In addition, the hook-shaped portion enables better spacing of the straight portions of the channels. The shape of the channels is also optimized to provide adequate cooling in the event of plugged channels. The disclosed embodiments of the inner turbine shroud segment may enable cooling of the inner turbine shroud segment with less air (e.g., than typical cooling systems for turbine shrouds) resulting in reduced costs associated with chargeable air utilized in cooling.

Turning to the drawings, FIG. 1 is a block diagram of an embodiment of a turbine system 10. As described in detail below, the disclosed turbine system 10 (e.g., a gas turbine engine) may employ a turbine shroud having cooling channels, described below, which may reduce the stress modes in the hot gas path components and improve the efficiency of the turbine system 10. The turbine system 10 may use liquid or gas fuel, such as natural gas and/or a hydrogen rich synthetic gas, to drive the turbine system 10. As depicted, fuel nozzles 12 intake a fuel supply 14, mix the fuel with an oxidant, such as air, oxygen, oxygen-enriched air, oxygen reduced air, or any combination thereof. Although the following discussion refers to the oxidant as the air, any suitable oxidant may be used with the disclosed embodiments. Once the fuel and air have been mixed, the fuel nozzles 12 distribute the fuel-air mixture into a combustor 16 in a suitable ratio for optimal combustion, emissions, fuel consumption, and power output. The turbine system 10 may include one or more fuel nozzles 12 located inside one or more combustors 16. The fuel-air mixture combusts in a chamber within the combustor 16, thereby creating hot pressurized exhaust gases. The combustor 16 directs the exhaust gases (e.g., hot pressurized gas) through a transition piece into a turbine nozzle (or "stage one nozzle"), and other stages of buckets (or blades) and nozzles causing rotation of a turbine 18 within a turbine casing 19 (e.g., outer casing). The exhaust gases flow toward an exhaust outlet 20. As the exhaust gases pass through the turbine 18, the gases force turbine buckets (or blades) to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. A portion of the compressed air (e.g., discharged air) from the compressor 24 may be diverted to the turbine 18 or its components without passing through the combustor 16. The discharged air (e.g., cooling fluid) may be utilized to cool turbine components such as shrouds and nozzles on the stator, along with buckets, disks, and spacers on the rotor. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10. The turbine system 10 may extend along an axial axis or direction 30, a radial direction 32 toward or away from the axis 30, and a circumferential direction 34 around the axis 30. In an embodiment, hot gas components (e.g., turbine shroud, nozzle, etc.) are located in the turbine 18, where hot gases flow across the components causing creep, oxidation, wear, and thermal fatigue of the turbine components. The turbine 18 may include one or more turbine shroud segments (e.g., inner turbine shroud segments) having a cooling passages (e.g., near surface microchannels) to enable control of the temperature of the hot gas path components (e.g., utilizing less cooling air than typical cooling systems for shrouds) to reduce distress modes in the components, to extend service life of the components (while performing their intended functions), reduce costs associated with operating the turbine system 10, and to improve the efficiency of the gas turbine system 10.

Figure 2:
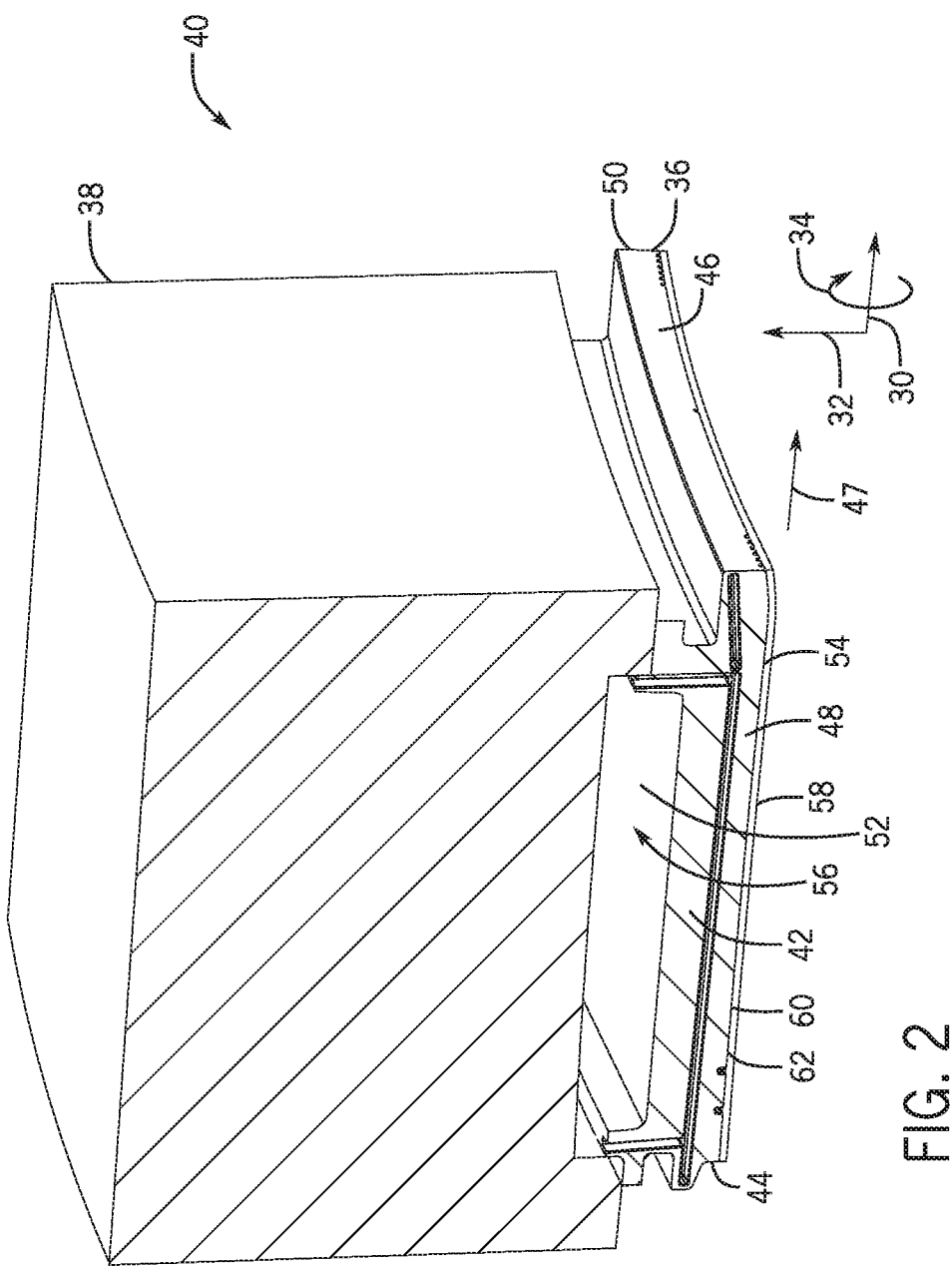
FIG. 2 is a perspective view of an embodiment of an inner turbine shroud segment coupled to an outer turbine shroud segment.

FIG. 2 is a perspective view of an embodiment of an inner turbine shroud segment 36 coupled to an outer turbine shroud segment 38 to form a turbine shroud segment 40. The turbine 18 includes multiple turbine shroud segments 40 that together form a respective ring about respective turbine stages. In certain embodiments, the turbine 18 may include multiple inner turbine shroud segments 36 coupled to respective outer turbine shroud segments 38 for each turbine shroud segment 40 disposed in the circumferential direction 34 about a rotational axis of the turbine 18 (and a turbine stage). In other embodiments, the turbine 18 may include multiple inner turbine shroud segments 38 coupled to the outer turbine shroud segment 38 to form the turbine shroud segment 40.

As depicted, the inner turbine shroud segment 40 includes a body 42 having an upstream or leading edge 44 and a downstream or trailing edge 46 that both interface with a hot gas flow path 47. The body 42 also includes a first side edge 48 (e.g., first slash face) and a second side edge 50 (e.g., second slash face) disposed opposite the first side edge 48 both extending between the leading edge 44 and the trailing edge 46. The body 42 further includes a pair of opposed lateral sides 52, 54 extending between the leading and trailing edges 44, 46 and the first and second side edges 48, 50. In certain embodiments, the body 42 (particularly, lateral sides 52, 54) may be arcuate shaped in the circumferential direction 34 between the first and second side edges 48, 50 and/or in the axial direction 30 between the leading and trailing edges 44, 46. The lateral side 52 is configured to interface with a cavity 56 defined between the inner turbine shroud segment 36 and the outer turbine shroud segment 38. The lateral side 54 is configured to be oriented toward the hot gas flow path 47 within the turbine 18.

As described in greater detail below, the body 42 may include multiple channels (e.g., cooling channels or microchannels) disposed within the lateral side 54 to help cool the hot gas flow path components (e.g., turbine shroud 40, inner turbine shroud segment 36, etc.). A pre-sintered preform (PSP) layer 58 may be disposed on (e.g., brazed onto) the lateral side 54 so that a first surface 60 of the PSP layer 58 together with the body 42 defines (e.g., enclose) the channels and a second surface 62 of the PSP layer 58 interfaces with the hot gas flow path 47. The PSP layer 58 may be formed of superalloys and brazing material. In certain embodiments, as an alternative to the PSP layer 58 a non-PSP metal sheet may be disposed on the lateral side 54 that together with the body 42 defines the channels. In certain embodiments, the channels may be cast entirely within the body 42 near the lateral side 54. In certain embodiments, as an alternative to the PSP layer 58, a barrier coating or thermal barrier coating bridging may be utilized to enclose the channels within the body 42.

In certain embodiments, the body 42 includes hook portions to enable coupling of the inner turbine shroud turbine segment 36 to the outer turbine shroud segment 38. As mentioned above, the lateral side 52 of the inner turbine shroud segment 36 and the outer turbine shroud segment 38 define the cavity 56. The outer turbine shroud segment 38 is generally proximate to a relatively cool fluid or air (i.e., cooler than the temperature in the hot gas flow path 47) in the turbine 18 from the compressor 24. The outer turbine shroud segment 38 includes a passage (not shown) to receive the cooling fluid or air from the compressor 24 that provides the cooling fluid to the cavity 56. As described in greater detail below, the cooling fluid flows to the channels within the body 42 of the inner turbine shroud segment 36 via inlet passages disposed within the body 42 extending from the lateral side 52 to the channels. Each channel includes a first end portion that includes a hook-shaped portion having a free end and a second end portion. The second end portion may include a metering feature (e.g., a portion of the body 42 extending into the channel that narrow a cross-sectional area of a portion of the channel relative to the adjacent cross-sectional area of the channel) to regulate flow of the cooling fluid within the channel. In certain embodiments, each channel itself (excluding the second end portion) acts as a metering feature (e.g., includes a portion of the body 42 extending into the channel). In other embodiments, inlet passages coupled to the hook-shaped portion may include a metering feature (e.g., portion of the body 42 extending into the inlet passage). In certain embodiments, the channel itself, the second end portion, or the inlet passage, or a combination thereof includes a metering feature. In addition, the cooling fluid exits the channels (and the body 42) via the second end portions at the first side edge 48 and/or the second side edge 50. In certain embodiments, the channels may be arranged in an alternating pattern with a channel having the first end portion disposed adjacent the first side edge 48 and the second end portion disposed adjacent the second side edge 50, while an adjacent channel has the opposite orientation (i.e., the first end portion disposed adjacent the second side edge 50 and the second end portion disposed adjacent the first side edge 48). The hook-shaped portions of the channels provide a larger cooling region (e.g., larger than typical cooling systems for turbine shrouds) by increasing a length of cooling channel adjacent the slash faces while keeping flow at a minimum. In addition, the hook-shaped portion enables better spacing of the straight portions of the channels. The shape of the channels is also optimized to provide adequate cooling in the event of plugged channels. The disclosed embodiments of the inner turbine shroud segment may enable cooling of the inner turbine shroud segment with less air (e.g., than typical cooling systems for turbine shrouds) resulting in reduced costs associated with regards to chargeable air utilized in cooling.

Figure 3:
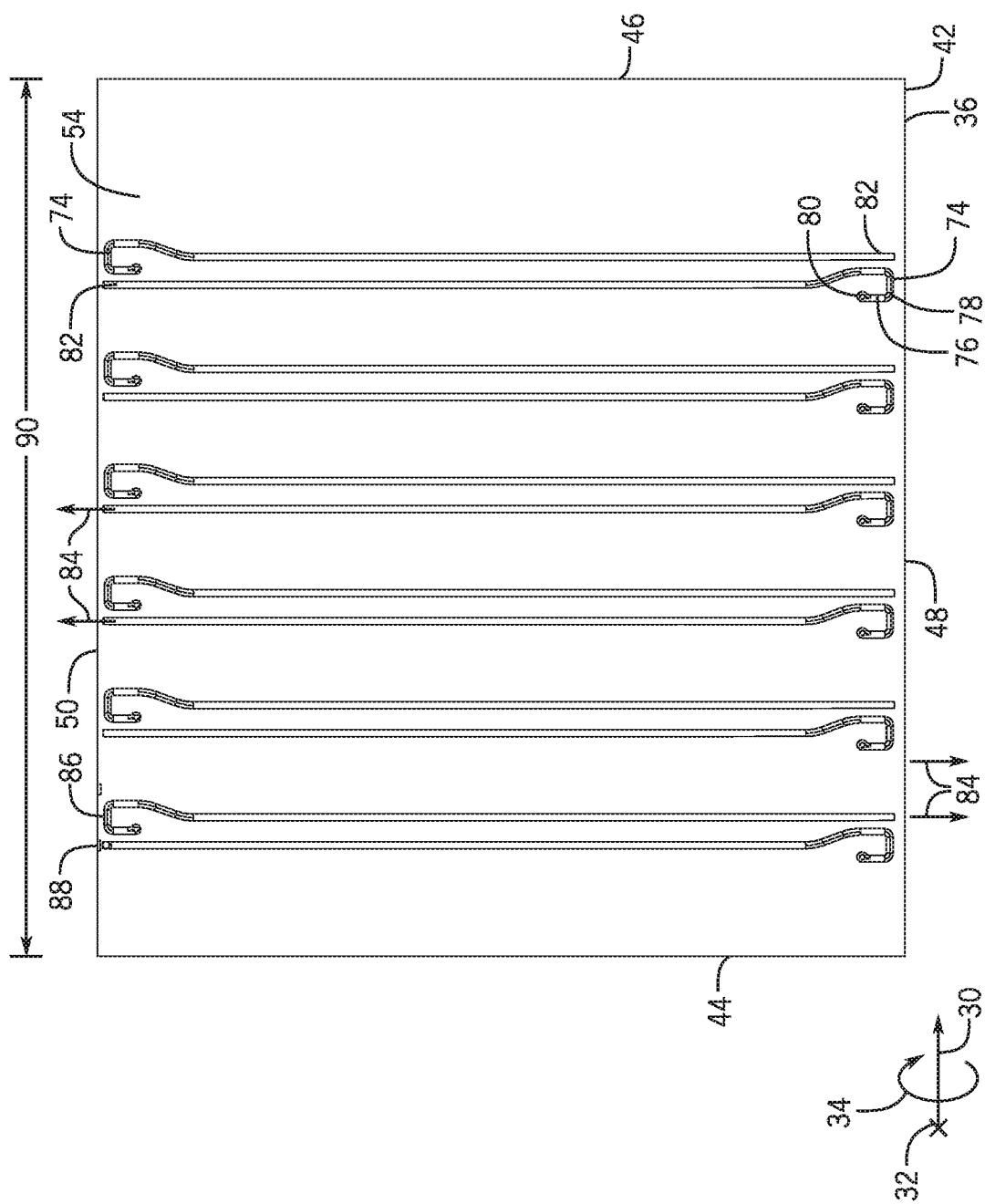
FIG. 3 is a bottom view (e.g., view of lateral side that is oriented toward a hot gas flow path) of an embodiment of an inner turbine shroud segment.

FIG. 3 is a bottom view (e.g., view of the lateral side 54 of the body 42 that is oriented toward hot gas flow path) of an embodiment of the inner turbine shroud segment 36 without the PSP layer 58. As depicted, the body 42 includes a plurality of channels 74 (e.g., cooling channels or microchannels) disposed within the lateral side 54. The body 42 may include 2 to 40 or more channels 74 (as depicted, the body 42 includes 23 channels 74). Each channel 74 is configured to receive a cooling fluid from the cavity 56. Each channel 74 includes a first end portion 76 that includes a hook-shaped portion 78 having a free end 80. Each hook-shaped portion 78 has a hook turn radius ranging from approximately 0.05 to 4 millimeters (mm), 0.1 to 3 mm, 1.14 to 2.5 mm, and all subranges therebetween. As described in greater detail below, the free end 80 of each hook-shaped portion 78 is coupled to inlet passages that enable the channels 74 to receive the cooling fluid from the cavity 56. The curvature of the hook-shaped portion 78 enables more channels 74 to be disposed within the lateral side 54. In addition, the hook-shaped portion 78 provide a larger cooling region (e.g., larger than typical cooling systems for turbine shrouds) by increasing a length of cooling channel 74 adjacent the side edges 48, 50 while keeping flow at a minimum. In addition, the hook-shaped portion 78 enables better spacing of the straight portions of the channels 74. Further, the turning back of the hook-shaped portion 78 enables the straight portions of the channels to be uniformly distant from an adjacent channel to cool the main portion of the body 42 of the shroud segment 36. In certain embodiments, the hook-shaped portion 78 could be adjusted to enable the spacing of the straight portions of the channels 74 to be tighter packed for higher heat load zones. Overall, the shape of the channels 74 is also optimized to provide adequate cooling in the event of plugged channels 74. Each channel 74 also includes a second end portion 82 that enables the spent cooling fluid to exit the body 42 via the side edges 48, 50 via exit holes as indicated by the arrows 84. In certain embodiments, the second end portion 82 includes a metering feature configured to regulate (e.g., meter) a flow of the cooling fluid within the respective channel 74. In certain embodiments, each channel 74 may form a segmented channel at the second end portion 82. In particular, a bridge portion of the body 42 may extend across each channel 74 (e.g., in a direction from the leading edge 44 to the trailing edge 46) within the second end portion 82 with a portion of the channel 74 upstream of the bridge portion and a portion of the channel 74 downstream of the bridge portion. A passage may extend underneath the bridge portion fluidly connecting the portions of the channel 74 upstream and downstream of the bridge portion. In certain embodiments, each channel 74 itself (excluding the second end portion 82) acts as a metering feature (e.g., includes a portion of the body 42 extending into the channel). In other embodiments, inlet passages coupled to the hook-shaped portion 78 may include a metering feature (e.g., portion of the body 42 extending into the inlet passage). In certain embodiments, the channel 74 itself, the second end portion 82, or the inlet passage, or a combination thereof includes a metering feature.

As depicted, some of the channels 74 (e.g., channel 86) include the hook-shaped portion 78 of the first end portion 76 disposed adjacent the side edge 50 and the second end portion 82 disposed adjacent the side edge 48, while some of the channels 74 (e.g., channel 88) include the hook-shaped portion 78 of the first end portion 76 disposed adjacent the side edge 48 and the second end portion 82 disposed adjacent the side edge 50. In certain embodiments, the channels 74 are disposed in an alternating pattern (e.g., channels 86, 88) with one channel 74 having the hook-shaped portion 78 disposed adjacent one side edge 48 or 50 and the second end portion 82 (e.g., in certain embodiments having the metering feature) disposed adjacent the opposite side edge 48 or 50 with the adjacent channel 74 having the opposite orientation. As depicted, the channels 74 extend between the side edges 48, 50 from adjacent the leading edge 44 to adjacent the trailing edge 46. In certain embodiments, the channels 74 may extend between the side edges 48, 50 covering approximately 50 to 90 percent, 50 to 70 percent, 70 to 90 percent, and all subranges therein, of a length 90 of the body 42 between the leading edge 44 and trailing edge 46. For example, the channels 74 may extend between the side edges 48, 50 covering approximately 50, 55, 60, 65, 70, 75, 80, 85, or 90 percent of the length 90. This enables cooling along both of the side edges 48, 50 as well as cooling across a substantial portion of the body 42 (in particular, the lateral side 54 that is oriented toward the hot gas flow path 47) between both the leading edge 44 and the trailing edge 46 and the side edges 48, 50.

Figure 4:
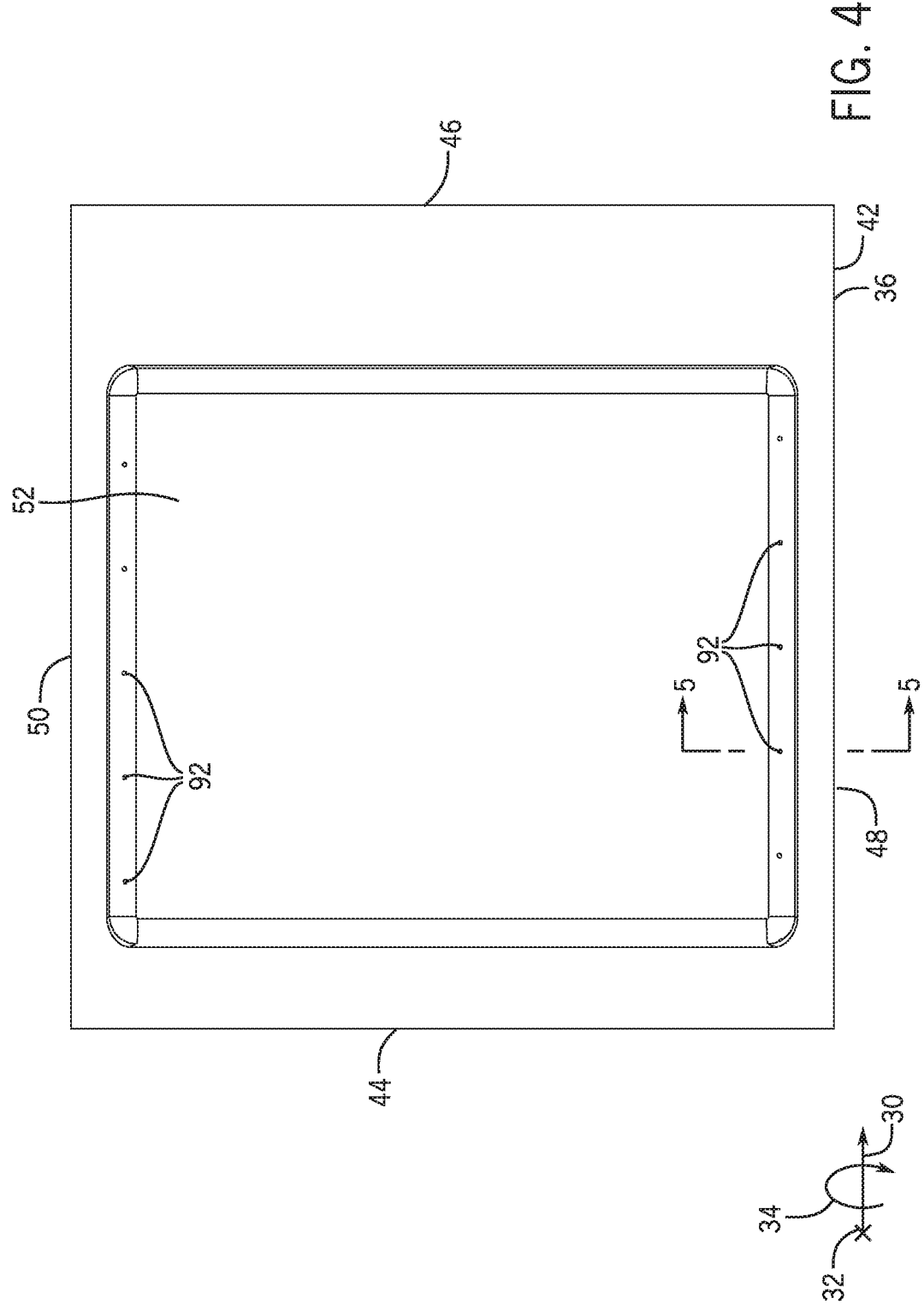
FIG. 4 is a top view (e.g., view of lateral side that interfaces with a cavity) of an embodiment of an inner turbine shroud segment.
Figure 5:
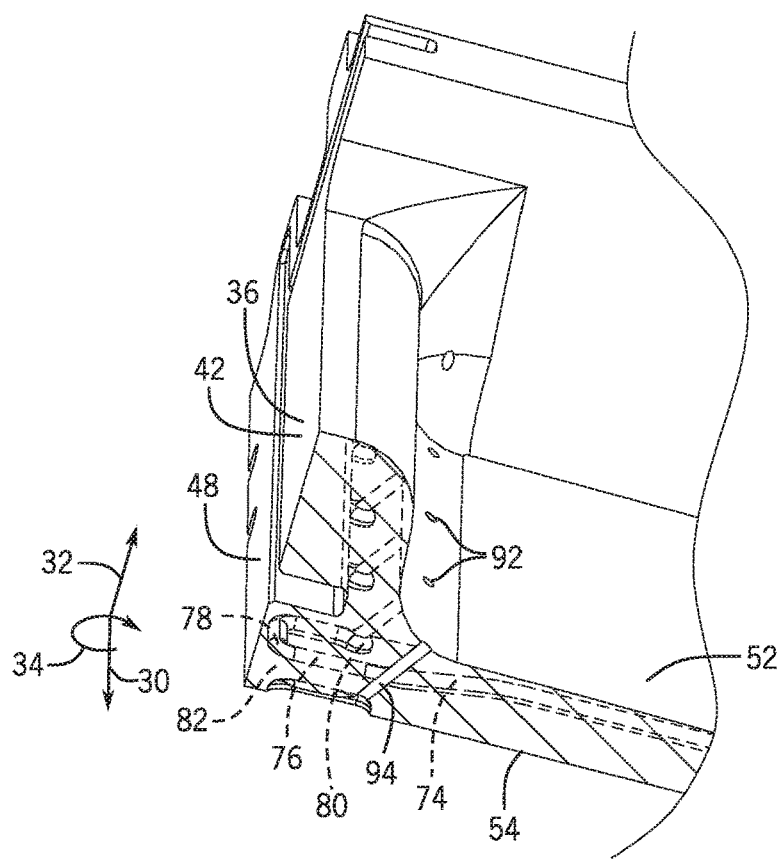
FIG. 5 is a perspective cross-sectional view of an embodiment of a portion of the inner turbine shroud segment of FIG. 4, taken along line 5-5 (with inlet passages and channels shown in dashed lines)

FIG. 4 is a top view (e.g., view of the lateral side 52 that interfaces with the cavity 56) of an embodiment of the inner turbine shroud segment 36. As depicted, the body includes a plurality of opening or apertures 92 that enable cooling fluid to flow from the cavity 56 into the channels 74 via inlet passages. FIG. 5 is a perspective cross-sectional view of an embodiment of the inner turbine shroud segment 36 of FIG. 4, taken along line 5-5. As depicted, inlet passages 94 (shown in dashed lines) extend generally in the radial direction 32 from the free ends 80 of the hook-shaped portions 78 of the channels 74 to the lateral side 52 to enable the flow of cooling fluid into the channels 74. In certain embodiments, the inlet passages 94 may be angled relative to the lateral side 54. For example, an angle of the inlet passages 94 may range between approximately 45 and 90 degrees, 45 and 70 degrees, 70 and degrees, and all subranges therein.

Figure 6:
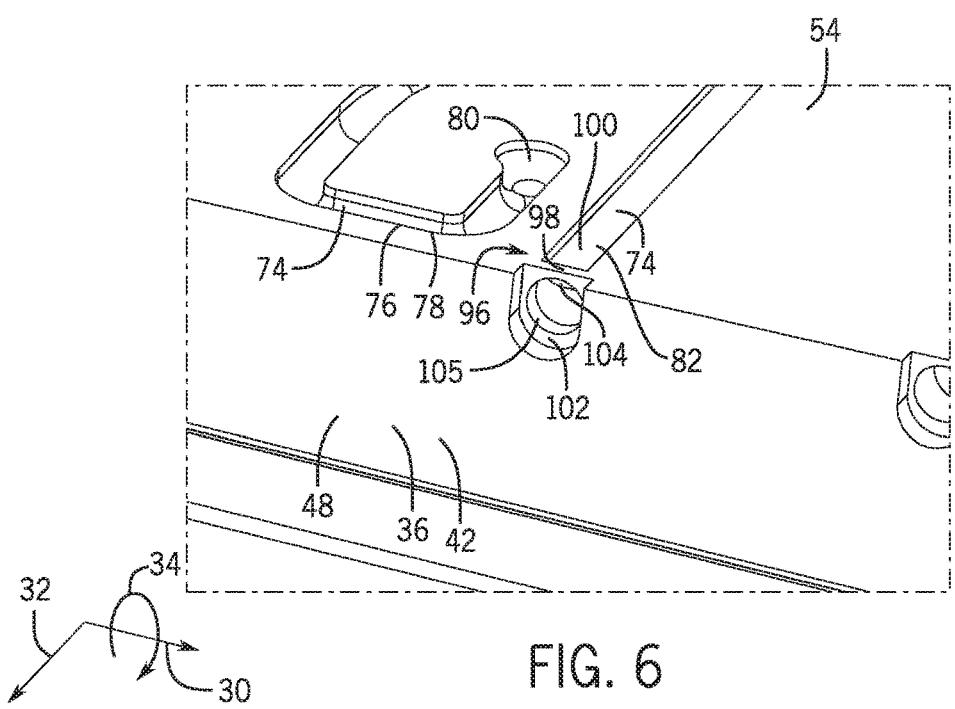
FIG. 6 is a perspective view of an embodiment of a portion of an inner turbine shroud segment.

FIG. 6 is a perspective view of a portion of an embodiment of the inner turbine shroud segment 36 (e.g., without the PSP layer 58) illustrating a segmented channel 96 for the second end portion 82 of the channel 74. In certain embodiments, the second end portion 82 includes bridge portion 98. In particular, the bridge portion 98 of the body 42 may extend across each channel 74 (e.g., in a direction (e.g., axial direction 30) from the leading edge 44 to the trailing edge 46) within the second end portion 82 to form the segmented 96 with a portion 100 of the channel 74 upstream of the bridge portion 98 and a portion 102 of the channel 74 downstream of the bridge portion 98. During manufacturing of the shroud segment 36 (prior to drilling or electrical discharge machining exit holes 105), the bridge portion 98 may extend entirely across the channel 74 in both the axial direction 30 and the radial direction 32 to avoid the plugging an exit of the channel due to the deposition of layers on the body 42 (e.g., PSP layer 58, barrier coating, thermal barrier coating, etc.). After depositing layers on the body 42, an exit hole 105 is drilled or electrical discharge machined into bridge portion 98 to form a passage 104. After forming the exit hole 105, the bridge portion 98 may only extend partially into the channel 74. A passage 104 may extend underneath the bridge portion 98 fluidly connecting the portions 100, 102 of the channel 74 upstream and downstream of the channel 74 to enable cooling fluid to exit via exit holes 105. Depending on the cross-sectional area of the passage 104 or exit hole 105 relative to the channel 74 (specifically, the cross-sectional area) of the portion 100, the passage 104 or exit hole 105 may act as a metering feature configured to regulate (e.g., meter) a flow of the cooling fluid with the respective channel 74. In certain embodiments, each channel 74 itself (excluding the second end portion 82) acts as a metering feature (e.g., includes a portion of the body 42 extending into the channel). In other embodiments, inlet passages 94 coupled to the hook-shaped portion 78 may include a metering feature (e.g., portion of the body 42 extending into the inlet passage). In certain embodiments, the channel 74 itself, the second end portion 82, or the inlet passage 94, or a combination thereof includes a metering feature.

Figure 7:
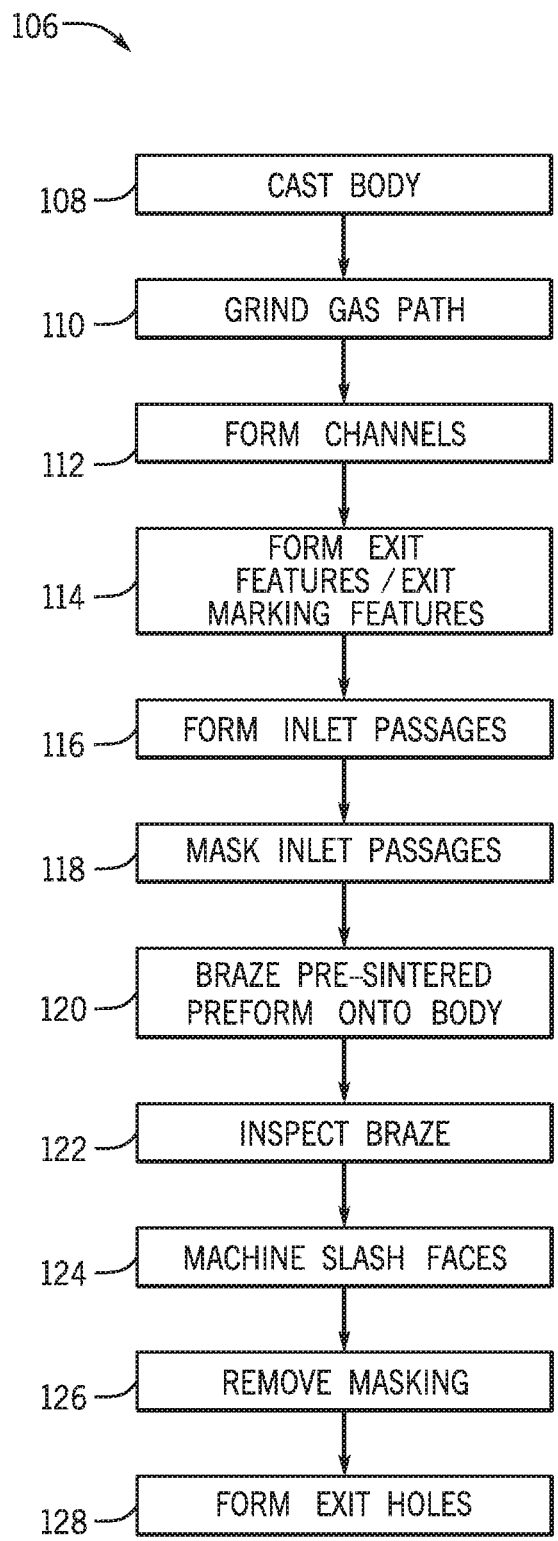
FIG. 7 is a flow chart of an embodiment of a method for manufacturing an inner turbine shroud segment.

FIG. 7 is a flow chart of an embodiment of a method 106 for manufacturing the inner turbine shroud segment 36. The method 106 includes casting the body 42 (block 108). The method 106 also includes grinding a gas path surface onto to the body 42 (block 110). In particular, the lateral side 54 that is configured to be oriented toward the hot gas flow path 47 may be grinded into an arcuate shape in the circumferential direction 34 between the first and second side edges 48, 50 and/or in the axial direction 30 between the leading and trailing edges 44, 46. The method 106 further includes forming (e.g., machining, electrical discharge machining, etc.) the channels 74 into the lateral side 54 of the body 42 (block 112). The method 106 yet further includes forming (e.g., machining, electrical discharge machining, etc.) the exit features or exit marking features (e.g., bridge portion 102) that indicate where exits holes 105 should be drilled or electrical discharge machined in the second end portion 82 of the channels 74 (block 114). The method 106 still further includes forming (e.g., machining, electrical discharge machining, etc.) the inlet passages 94 from the lateral 52 to the free ends 80 of the hook-shaped portions 78 of the first end portions 76 of the channels 74 (block 116). The method 106 includes masking the openings or apertures 92 of the inlet passages 94 (block 118) to block debris from getting within the channels 74 during manufacture of the inner turbine shroud segment 36. The method 106 includes brazing the PSP layer 58 onto the lateral side 54 (block 120) so that the first surface 60 of the PSP layer 58 together with the body 42 defines (e.g., encloses) the channels 74 and the second surface 62 of the PSP layer 58 interfaces with the hot gas flow path 47. In certain embodiments, as an alternative to the PSP layer 58 a non-PSP metal sheet may be disposed on the lateral side 54 that together with the body 42 defines the channels 74. In certain embodiments, as an alternative to the PSP layer 58, a barrier coating or TBC bridging may be utilized to enclose the channels 74 within the body 42. The method 106 also includes inspecting the brazing of the PSP layer 58 to the body 42 (block 122). The method 106 yet further includes machining the slash faces (e.g., side edges 48, 50) (block 124). The method 106 still further includes removing the masking from the openings 92 of the inlet passages 94 (block 126). The method 106 even further includes forming (e.g., machining, electrical discharge machining, etc.) the exit holes 105 of the second end portions 82 of the channels 74 to enable the cooling fluid to exit the side edges 48, 50 (block 128). In certain embodiments, the channels 74, the metering features, and the inlet passages 94 may be cast within the body 42.

Technical effects of the disclosed embodiments include providing systems and methods for cooling an inner turbine shroud segment 36. In particular, the inner turbine shroud segment 36 includes near surface micro-channels 74 on the lateral side 54 that are enclosed within the body 42 via the PSP layer 58. The channels 74 include the hook-shaped portions 78 coupled to inlet passages 94 to enable cooling fluid to flow into the channels 74 to cool the inner turbine shroud segment 36. The channels 74 also may include a metering feature to regulate the flow of the cooling fluid within the channels 74. The hook-shaped portions 78 of the channels 74 provide a larger cooling region (e.g., larger than typical cooling systems for turbine shrouds) adjacent the slash faces (e.g., sided edges 48, 50) while keeping flow at a minimum. The shape of the channels 74 is also optimized to provide adequate cooling in the event of plugged channels 74. The disclosed embodiments of the inner turbine shroud segment 36 may enable cooling of the inner turbine shroud segment 36 with less air (e.g., than typical cooling systems for turbine shrouds) resulting in reduced costs associated with regards to chargeable air utilized in cooling.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A shroud segment for use in a turbine section of a gas turbine engine, comprising:
   a body including a leading edge, a trailing edge, a first side edge, a second side edge, and a pair of opposed lateral sides between the leading and trailing edges and between the first and second side edges, wherein a first lateral side of the pair of opposed lateral sides is configured to interface with a cavity having a cooling fluid, and a second lateral side of the pair of opposed lateral sides is oriented toward a hot gas flow path;
   a first channel defining a first straight portion, the first channel being at least partially defined by the body and extending along a surface of the body at the second lateral side, the first channel having a first end and a second end, the first end being disposed at a first location along the first side edge and the second end being disposed at a second location along the second side edge, the first end comprising a first hook-shaped portion of the first channel, the first hook-shaped portion being disposed along the first side edge and having a first inlet for receiving the cooling fluid, and the second end having a first outlet for discharging the cooling fluid; and
   a second channel defining a second straight portion, the second channel being at least partially defined by the body and extending along a surface of the body at the second lateral side, the second channel having a third end and a fourth end, the third end being disposed at a third location along the first side edge and the fourth end being disposed at a fourth location along the second side edge, the fourth end comprising a second hook-shaped portion of the second channel, the second hook-shaped portion being disposed along the second side edge, the second hook-shaped portion having a second inlet for receiving the cooling fluid, and the third end having a second outlet for discharging the cooling fluid,
   wherein the first hook-shaped portion is curved toward the leading edge from the first straight portion to the first inlet, and wherein the second hook-shaped portion is curved toward the leading edge from the second straight portion to the second inlet.

2. The shroud segment of claim 1, comprising a plurality of the first channels and a plurality of the second channels.

3. The shroud segment of claim 2, wherein the plurality of the first channels and the plurality of the second channels are arranged in an alternating pattern with each first channel of the plurality of the first channels being disposed adjacent a respective second channel of the plurality of the second channels so that each first end of the plurality of the first channels is disposed adjacent a respective third end of the plurality of the second channels, and each second end of the plurality of the first channels is disposed adjacent a respective fourth end of the plurality of the second channels.

4. The shroud segment of claim 1, comprising a first inlet passage coupled to the first inlet of the first hook-shaped portion, and a second inlet passage coupled to the second inlet of the second hook-shaped portion, wherein the first and second inlet passages extend in a radial direction from the first and second hook-shaped portions, respectively, to the first lateral side, and wherein the first and second inlet passages are configured to provide the cooling fluid from the cavity to the first and second channels, respectively.

5. The shroud segment of claim 4, wherein the first and second inlet passages are electrical discharge machined into the body.

6. The shroud segment of claim 1, comprising a first outlet passage coupled to the second end of the first channel and extending from the second end of the first channel to the second side edge, and a second outlet passage coupled to the third end of the second channel and extending from the third end of the second channel to the first side edge, wherein the first outlet passage is configured to discharge the cooling fluid from the shroud segment from the second side edge, and the second outlet passage is configured to discharge the cooling fluid from the shroud segment from the first side edge.

7. The shroud segment of claim 6, wherein the first and second outlet passages are configured to meter respective flows of the cooling fluid from the first and second channels.

8. The shroud segment of claim 6, wherein the first and second outlet passages are electrical discharge machined into the body.

9. The shroud segment of claim 1, wherein the first and second channels are electrical discharge machined into the body.

10. The shroud segment of claim 1, comprising a pre-sintered preform layer brazed onto the second lateral side, wherein the pre-sintered preform layer comprises a first surface configured to interface with the hot gas flow path and a second surface that, together with the body, defines the first and second channels.

11. A gas turbine engine, comprising:
a compressor;
a combustion system; and
a turbine section, comprising:
   an outer casing;
   an outer shroud segment coupled to the outer casing;
   an inner shroud segment coupled to the outer shroud segment to form a cavity configured to receive a cooling fluid from the compressor, wherein the inner shroud segment comprises:
      a body including a leading edge, a trailing edge, a first side edge, a second side edge, and a pair of opposed lateral sides between the leading and trailing edges and between the first and second side edges, wherein a first lateral side of the pair of opposed lateral sides is configured to interface with the cavity, and a second lateral side of the pair of opposed lateral sides is oriented toward a hot gas flow path;
      a plurality of channels being at least partially defined by the body and extending along a surface of the body at the second lateral side, each channel defining a respective straight portion, each straight portion extending from a respective location along the first side edge to a respective location along the second side edge,
      wherein each channel of the plurality of channels has a respective first end and a respective second end, each first end comprising a respective hook-shaped portion of the respective channel, each hook-shaped portion having a respective inlet configured to receive the cooling fluid from the cavity, and each second end having a respective outlet configured to discharge the cooling fluid;
      wherein the plurality of channels comprises a plurality of first channels and a plurality of second channels, each hook-shaped portion of the plurality of first channels being disposed along the first side edge, each second end of the plurality of first channels being disposed along the second side edge, each hook-shaped portion of the plurality of second channels being disposed along the second side edge, each second end of the plurality of second channels being disposed along the first side edge, and wherein the plurality of first channels and the plurality of second channels are arranged in an alternating pattern across a length of the body extending from the leading edge to the trailing edge with each channel of the plurality of first channels being disposed adjacent a respective channel of the plurality of second channels, and
   wherein each respective hook-shaped portion of the plurality of first channels and each respective hook-shaped portion of the plurality of second channels is curved toward the leading edge from the respective straight portion of the respective channel to the respective inlet of the respective hook-shaped portion.

12. The gas turbine engine of claim 11, comprising a plurality of inlet passages, each inlet passage of the plurality of inlet passages being coupled to a respective inlet of a respective hook-shaped portion of a respective channel and extending in a radial direction from the respective inlet to the first lateral side, wherein each inlet passage is configured to provide the cooling fluid from the cavity to a respective channel of the plurality of channels.

13. The gas turbine engine of claim 11, comprising a plurality of outlet passages, each outlet passage of the plurality of outlet passages being coupled to a respective second end of a respective channel of the plurality of channels and extending from the respective second end of the respective channel to the first side edge or the second side edge, wherein a first set of the plurality of outlet passages is configured to discharge the cooling fluid from the inner shroud segment at the first side edge, and a second set of the plurality of outlet passages is configured to discharge the cooling fluid from the inner shroud segment at the second side edge.

14. The gas turbine engine of claim 11, comprising a pre-sintered preform layer brazed onto the second lateral side, wherein the pre-sintered preform layer comprises a first surface configured to interface with the hot gas flow path and a second surface that, together with the body, defines the plurality of channels.

15. The gas turbine engine of claim 11, comprising a plurality of inner shroud segments circumferentially disposed about a rotational axis of the turbine section.

* * * * *